3,674,431
GENERATION OF SILICON TETRAFLUORIDE
Richard E. Driscoll and George L. De Cuir, Monroe, La., assignors to Cities Service Company, New York, N.Y.
No Drawing. Filed July 1, 1970, Ser. No. 51,699
Int. Cl. C01b *33/08, 33/02*
U.S. Cl. 23—205                                                                                    12 Claims

ABSTRACT OF THE DISCLOSURE

Silicon tetrafluoride is generated by passing a mixture of HF and water through a pervious bed of crystalline silica. A reaction mixture of $SiF_4$, HF and water is formed in the silica bed and is maintained in a vapor-liquid phase at about the dew point until the HF therein has substantially reacted with the silica. At the same time, the liquid of the reaction mixture undergoes vaporization by absorbing the heat of the reaction, and conditions are established and maintained to effect vaporization of the liquid at about the same rate that it is introduced into the bed. The reaction thus proceeds in both a liquid-solid phase and a vapor-solid phase at the same time to effect conversion of HF to $SiF_4$ at high efficiencies.

BACKGROUND OF THE INVENTION

This invention pertains to the generation of silicon tetrafluoride by reaction of hydrofluoric acid with silicon dioxide, and more particularly relates to generation of vapor mixtures of silicon tetrafluoride and water vapor which can be employed, for instance, in the manufacture of pigmentary silica by hydrolysis of silicon tetrafluoride.

It is well known that silica, in the form of sand for example, can be dissolved in aqueous hydrofluoric acid to produce hydrofluosilicic acid which can in turn be vaporized to liberate silicon tetrafluoride:

(1)  

A disadvantage of this method of generating $SiF_4$ is that HF is also liberated in the mole ratio of 2/1, and this is undesirable in many cases and also amounts to inefficient conversion of the HF and $SiF_4$.

Advanced methods of generating silicon tetrafluoride in high yields by reacting silica with vaporized hydrofluoric acid or hydrofluosilicic acid are disclosed in U.S. Pats. 3,233,969 and 3,273,963, respectively. In accordance with these methods, either vaporized hydrofluoric or hydrofluosilicic acid is passed through a pervious bed of silica for reaction of HF therewith while maintaining the temperature of the reaction below about 430°–450° F., and more preferably at a temperature within the range of about 250° to 370° F., but in any case at a temperature above the condensation temperature of the vapors in the bed. It had been discovered, however, that conditions must be ideal at all times in order to continuously achieve such efficiencies during commercial operation. If, for instance, temperature control of the bed is erratic, or too high, or if channels form in the pervious bed of silica, conversion efficiencies can be much lower than 90%.

SUMMARY OF THE INVENTION

The present invention amounts to the discovery that HF can be converted to $SiF_4$ at high efficiencies, e.g. in excess of 90% by passing HF in mixture with water through a bed of pervious silica for reaction therewith while maintaining the resultant reaction mixture of $SiF_4$, HF and water in a vapor-liquid phase in the silica bed at about the dew point of the reaction mixture for a length of time sufficient for substantial reaction of the HF with the silica. At the same time, the liquid of the reaction mixture undergoes vaporization by absorption of heat liberated by the exothermic reaction of the HF with the silica. Thus, the silica in the bed reacts with HF while the latter is in both a liquid and a vapor phase to effect substantially complete conversion of the HF to $SiF_4$, and it will be realized that this is accomplished by establishing and maintaining a temperature balance within the silica bed which permits coexistance therein of both vaporized and liquid HF, and whereby each phase is continuously reacting at the same time with the silica in the bed. However, the temperature and flow rate of the reaction mixture through the bed are set at a condition which effects vaporization of the liquid phase of the reaction mixture at a rate which is about equal to the rate at which the liquid phase is introduced into the bed, thus preventing substantial discharge of the liquid phase in the effluent vapor stream. This type of operation differs significantly from prior methods wherein liquid acid is introduced into the silica bed and is suddenly vaporized to maintain a temperature balance whereby condensation of the reaction mixture is deliberately avoided, for in those methods the intention is to maintain the silica bed dry and thus avoid liquid-solid reaction between the HF and silica. It will be understood, nonetheless, that it is possible in the present invention to achieve high conversion efficiency of HF to $SiF_4$ while continuously maintaining a liquid-solid reaction phase in the silica bed, and without substantial discharge of the liquid in the effluent vapor stream which contains the $SiF_4$.

DESCRIPTION OF PREFERRED EMBODIMENTS

When carrying out the invention, the dew point of the reaction mixture, which comprises $SiF_4$, HF and water vapor, is variable depending upon the proportion of constituents within the mixture but seldom exceeds about 250° F., and more commonly is within the range of about 200° F. to about 240° F. The proportion of the constituents in the reaction mixture is variable depending, among other things, upon the composition of the feedstream that is passed into the bed and upon the reaction pressure. In any given case, however, the approximate dew point of the reaction mixture can be determined by altering the temperature thereof to achieve first the presence and then the absence (or vice versa) of condensation. Thereafter, the reaction is maintained at a temperature which is near the determined dew point and which assures continuous coexistence of both a liquid and a vapor phase throughout the silica bed.

The proportion of HF and water in the mixture that is fed to the porous bed of silica is not critical in the present invention since it has no apparent effect upon the conversion efficiency of HF to $SiF_4$, but as a general rule it will be desirable to provide HF to the reaction by means of acids which are readily available, e.g. aqueous HF in the range of about 15% to about 70% and/or hydrofluosilicic acid of about 30% or higher, whereby the mole ratio of water to HF in the feedstream is within the range of about 0.5 to about 8.5.

It will be noted that hydrofluosilicic acid can be employed for supplying all, or a portion of, the HF and water that are fed to the bed of silica, and in which case substantial amounts of $SiF_4$ can be passed into the bed in the acid feedstream, since $SiF_4$ comes into existence merely by vaporization of the hydrofluosilicic acid. Advantageously, this portion of $SiF_4$ is not lost in the reaction, but is available in the effluent vapor stream from the bed in combination with additional $SiF_4$ produced by reaction of gaseous HF which is also liberated by vaporization of the fluosilicic acid.

In the present invention, the previous bed of silica is preferably elongated and made up of crystalline silica particles of high purity in the form of pebbles or crushed rock. The bed can also be formed of sand. To advantage, the bed can be contained in an elongated chamber which is insulated or jacketed of facilitate control of the reaction temperature. In any case, the flowing velocity of vapor through the bed should not be so high as to entrain the liquid or the silica so that they are blown out of the bed and discharged therefrom in substantial amounts in the effluent vapor stream which comprises the silicon tetrafluoride and water vapor produced by reaction of the HF with the silica. This is accomplished by restricting the mass flow of the reaction mixture through the silica bed and/or by sizing the cross-section of the bed so that flowing velocity is not excessive. Some liquid carry-over can be tolerated and can be subsequently collected or vaporized, but it will be appreciated that large quantities of carried over liquid will probably contain substantial amounts of hydrofluosilicic acid, and in which case, conversion of HF to $SiF_4$ becomes inefficient.

The desired liquid-vapor condition of the reaction mixture, at or near the dew point, can be established and maintained in the bed in one of several ways. Using aqueous hydrofluoric or fluosilicic acid, one method is to heat a stream of the liquid acid so that it is only partially vaporized to provide a "wet vapor" stream that is fed to the bed and which consists of vapor having liquid droplets entrained therein. The amount of liquid in the stream should be sufficient to effect substantial wetting of the silica particles throughout the bed while, at the same time, absorbing heat of the reaction to the extent that the temperature is maintained at about the dew point of the vapor constituents. The actual proportion of liquid and vapor in the feedstream can be controlled by regulating the time and temperature of heating in accordance with conventional practices.

In another method for controlling the reaction temperature, the acid is fed into the bed in two streams, one being a liquid and the other being a vapor. The purpose of the liquid stream is the same as that defined above for the liquid droplets of the "wet vapor" stream, but separate liquid and vapor streams are more preferable since proportioning of the liquid and vapor fractions of the feedstream is easier and subject to greater flexibility, and nicer control over the reaction temperature is thus provided.

It is also within the scope of the present invention to feed acid, to the silica bed, which is totally or predominately in either a vaporized or a liquid form and to produce the liquid or the vapor phase of the reaction mixture by supplying cooling or supplemental heat, respectively, from an external source.

As was indicated earlier, the amount of reaction mixture in the liquid phase should be sufficient to maintain the reaction temperature at about the dew point. It will therefore be appreciated that the intention is to achieve a condition whereby the silica particles are kept wet by the liquid, but while vaporizing the liquid at about the same rate that it is introduced into the bed, least the bed became dry on the one hand, or flooded on the other hand, due to excessive or inadequate vaporization, respectively.

It will be understood that the rate at which "liquid is introduced into the bed" is not entirely dependent upon the rate at which the liquid is introduced by means of the acid feedstream, since the reaction of HF with silica in the bed produces water as well as silicon tetrafluoride, and this water of the reaction is subject to some condensation in the bed because the reaction temperature is maintained at or near the dew point. Furthermore HF and $SiF_4$ can enter into a liquid phase during the reaction.

Without wishing to be bound by theory, it is suspected that several reactions are proceeding simultaneously within the silica bed during the practice of the present invention:

(1) 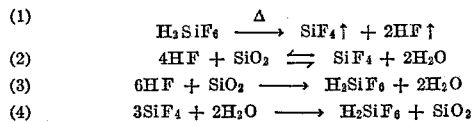
(2) 
(3) $6HF + SiO_2 \longrightarrow H_2SiF_6 + 2H_2O$
(4) $3SiF_4 + 2H_2O \longrightarrow H_2SiF_6 + SiO_2$ High conversion efficiency of HF to $SiF_4$ is dependent upon the reaction shown in Equation 2, this being a vapor phase reaction which proceeds significantly to the right only at temperatures above the dew point of $$SiF_4 - HF - H_2O$$

mixtures and below about 450° F. Although the reactions shown in Equations 3 and 4 are liquid phase reactions which, when operating alone, are much less efficient at converting HF to $SiF_4$, it must be pointed out that they are nonetheless employed to advantage in this invention in combination with the reactions shown in Equations 1 and 2 to effect substantially complete reaction of the HF to $SiF_4$. By means of reaction (3), for instance, HF reacts in the liquid phase with the silica to produce aqueous fluosilicic acid, but this is ultimately vaporized, as previously described, to provide $SiF_4$ and HF in the gaseous phase in accordance with the reaction shown in Equation 1. The resulting gaseous HF then reacts with the silica in accordance with Equation 2. Some of the $SiF_4$ in the system probably reacts with water in the liquid phase in accordance with Equation 3, which also produces aqueous hydrofluosilicic acid that is ultimately vaporized and converted to $SiF_4$ in the manner just described. If reaction (3) proceeds in the system, the silica produced thereby is converted directly to $SiF_4$ by means of reaction (2), or indirectly by means of reaction (3), followed by reaction (1).

Most surprisingly, it has been found that the reaction rate of HF to $SiF_4$ in the present invention is considerably faster than in a vapor-solid system operated solely in accordance with Equation 2, and as was earlier indicated, uniform contacting of the reactants and bed temperature are more easily controlled. It should be pointed out, however, that the overall material balance for the entire system is determined from Equation 2 so that the invention depends upon the existence of a vapor phase within the system as well as a liquid phase.

As was previously indicated, the HF and water vapor that are passed through the pervious bed of silica for production of $SiF_4$ can be obtained by use of hydrofluoric acid, hydrofluosilicic acid or mixtures thereof. Where preferred a stream of each can be introduced into the silica bed.

The effluent vapor stream from the bed will comprise the water of the feedstream, additional water produced by reaction of the HF with silica, the $SiF_4$, and a little HF. The actual amount of HF which will be present in the effluent stream will depend, of course, upon the efficiency of the reaction. To advantage, the effluent stream can be superheated after discharge from the bed to prevent condensation and formation of hydrofluosilicic acid and silica in accordance with reaction (4). However, unless the formation of pigmentary silica is desirable, the stream should not be heated excessively since reaction (2) starts to proceed significantly to the right at temperatures in excess of about 1100° F.

The effluent vapor stream can, of course, be directly utilized to produce fumed pigmentary silica by vapor phase hydrolysis of the silicon tetrafluoride at temperatures above about 1100° F., followed by separation of the silica from the water vapor, hydrogen fluoride, and any other gases or vapors which remain in mixture with the silica after the hydrolysis reaction. Where preferred, however, the effluent vapor stream from the silica bed can be treated with a desiccant, such as concentrated sulfuric acid, in order to produce a substantially pure stream of $SiF_4$.

EXAMPLE 450 pounds of high purity quartz pebbles, having a diameter of about one inch, were placed into a vertically disposed cylindrical chamber constructed of carbon brick and having a diameter of 15 inches and a length of 60 inches. The depth of the resulting bed of silica pebbles was about 60 inches and the chamber was insulated to minimize heat loss to the atmosphere.

In the first experiment, aqueous hydrofluoric acid having a concentration of 47.6% was fully vaporized at the rate of 26.2 pounds per hour and the resulting vapors were then introduced into the bottom of the generator chamber at a temperature of about 250° F. An effluent vapor stream consisting of water vapor, silicon tetrafluoride and unreacted HF was removed from the top of the generator above the bed of silica pebbles. This operation was continued for four hours, and the following temperatures (average) were observed in the bed:

12" above bottom=250° F.
24" above bottom=310° F.
36" above bottom=275° F.
48" above bottom=260° F.

The bed of silica pebbles was then checked for loss in weight (the generator chamber being mounted on scales) and the efficiency of conversion of HF to $SiF_4$ was determined to be 71.3%. It will be noted that the temperature of the reaction was maintained within a range of about 250° F.–310° F., but was somewhat erratic throughout the bed, and it should be pointed out that the reaction was carried out somewhat above dew point, i.e. condensation of the vapors was purposefully avoided.

The second experiment was run after the bed of silica pebbles had been restored to its original weight and height within the generating chamber. Hydrofluoric acid of the same strength was again fed to the bed at the same rate, but in this case 20 weight percent of the total feedstream was fed to the top of the bed as a liquid at atmospheric temperature while the other 80 weight percent was fed to the bottom of the bed in a totally vaporized form at 250° F. As before, the effluent vapor stream was removed from the top of the bed. The stream of liquid hydrofluoric acid was introduced into the bed in such a manner that little or no carry-over into the effluent stream occurred, while allowing the liquid to trickle down through the bed of pebbles. This operation was continued for 3.5 hours and the following temperatures (average) were observed in the bed:

12" above bottom=225° F.
24" above bottom=225° F.
36" above bottom=225° F.
48" above bottom=225° F.

In this case it was determined that the conversion efficiency of HF to $SiF_4$ was 92.5%, and it will be noted that temperatures were exceptionally uniform throughout the bed and at a substantially lower level than in the preceding case. Operation at the dew point was indicated by a very slight carry-over of hydrofluosilicic acid in the effluent stream, and thus was then vaporized by superheating the stream to about 300° F. This superheated stream was introduced into a furnace and was mixed therein with hot flame gases produced by burning methane with air, thus forming a hydrolysis mixture having a temperature of about 1600° F.–1800° F. The $SiF_4$ was thus hydrolyzed to provide a fumed pigmentary silica having a particle size of about 7 millimicrons and a B.E.T. surface area of about 300 m.²/gm. The fumed silica product was separated from the flame gases, hydrogen fluoride and excess water vapor by means of a bag filter.

While the present invention has been described with reference to particular materials, conditions, proportions, and the like it will be understood that various changes and modifications will become apparent which are nonetheless within the spirit and scope of the invention as is defined in the following claims.

Therefore, what is claimed is:

1. The method of generating silicon tetrafluoride which comprises:
    (a) introducing a mixture of HF and water vapor into a pervious bed of silica, reacting the HF with the silica and producing a reaction mixture comprising HF, $SiF_4$, and water;
    (b) establishing and maintaining conditions of temperature and flow rate in the bed of silica for coexistence therein of the reaction mixture in both liquid and vaporized phases, for reaction of the HF in both of said phases with the silica in the bed at the same time, and for vaporization of the liquid phase of the reaction mixture at a rate which is about equal to that at which it is formed in the bed of silica; and
    (c) recovering a vapor mixture from said bed which comprises water and $SiF_4$ which are products of reaction between HF and silica in the bed, and characterized by conversion of in excess of 90 weight percent of the HF introduced into the bed of silica into $SiF_4$.

2. The process of claim 1 wherein the temperature of the reaction mixture is maintained within the range of about 200° F. to about 250° F.

3. The method of claim 2 wherein the temperature of the reaction mixture is uniform throughout the bed.

4. The method of claim 1 wherein said mixture of HF and water that is passed through said pervious bed of crystalline silica has a mole ratio of water to HF within the range of about 0.5 to about 8.5.

5. The method of claim 1 wherein the HF and water are introduced to the bed as a wet vapor stream.

6. The method of claim 1 wherein the HF and the water are introduced into the silica bed in two streams, one of which is a vapor stream and the other of which is a liquid stream.

7. The method of claim 1 wherein the HF which reacts with the silica is derived from an acid selected from the group consisting of hydrofluoric acid, hydrofluosilicic acid, and mixtures thereof.

8. The method of claim 1 wherein the $SiF_4$ in the vapor mixture that is recovered from the silica bed is hydrolyzed for production of fumed silica by heating the vapor mixture to a temperature in excess of about 1100° F.

9. The process of claim 1 wherein the HF and water are introduced ot the silica bed in liquid form.

10. The process of claim 1 wherein the HF and water are introduced to the silica bed in the form of vapors.

11. The process of claim 1 wherein cooling is supplied to said reaction mixture from an external source.

12. The process of claim 1 wherein supplemental heat is supplied to said reaction mixture from an external source.

References Cited
UNITED STATES PATENTS

| | | | |
|---|---|---|---|
| 3,233,969 | 2/1966 | Heller et al. | 23—205 X |
| 3,273,963 | 9/1966 | Gunn, Jr. | 23—205 X |
| 3,511,603 | 5/1970 | Yaws | 23—205 X |

OSCAR R. VERTIZ, Primary Examiner

G. ALVARO, Assistant Examiner

U.S. Cl. X.R.

23—223.5